United States Patent [19]

Germain

[11] Patent Number: 4,763,819
[45] Date of Patent: Aug. 16, 1988

[54] SPREAD HOPPER WITH MOISTURE GUARD

[75] Inventor: Robert A. Germain, Harrisburg, Pa.

[73] Assignee: Emhart Industries Inc., Farmington, Conn.

[21] Appl. No.: 921,555

[22] Filed: Oct. 21, 1986

[51] Int. Cl.⁴ ............................................. A01C 15/06
[52] U.S. Cl. .................................................. 222/623
[58] Field of Search .............. 222/609, 614, 619, 620, 222/623–625, 410; 239/172; 47/1.7

[56] References Cited

U.S. PATENT DOCUMENTS

| | | | |
|---|---|---|---|
| 262,041 | 8/1882 | Heady | 222/625 X |
| 1,882,340 | 10/1932 | Ryan | 222/625 |
| 2,465,117 | 3/1949 | Pierson | 222/625 |
| 2,710,117 | 6/1955 | Fritz et al. | 222/625 X |
| 2,812,108 | 11/1957 | Chatfield | 222/625 X |
| 3,451,595 | 6/1969 | Dexter | 222/619 |
| 3,580,426 | 5/1971 | Manning | 222/625 |
| 4,635,818 | 1/1987 | Glass | 222/625 X |

*Primary Examiner*—Kevin P. Shaver
*Attorney, Agent, or Firm*—Barry E. Deutsch

[57] ABSTRACT

A spreader for fluent material has a hopper having front, rear, side walls, and a bottom wall connected to the front, rear and side walls. A plurality of discharge openings are formed in the bottom wall and extend therethrough. Each of the discharge openings has a leading end and a trailing end. A guard member is positioned adjacent to and forwardly of the leading end of each discharge opening and extends generally vertically downward from the outer surface of the bottom wall. The guard member extends from the bottom wall within a range of 0°–15° relative to a line defining the vertical axis of the hopper.

4 Claims, 3 Drawing Sheets

SPREAD HOPPER WITH MOISTURE GUARD

BACKGROUND OF THE INVENTION

This invention relates to spreaders for fluent material, and in particular, to such spreaders having a moisture barrier to prevent moisture from gaining entrance into the discharge openings and clog such openings as a consequence of the fluent material contained within the hopper absorbing the moisture.

Drop spreaders are used to broadcast fluent materials such as grass seed, fertilizer, and weed killer. Such spreaders are sometimes employed to broadcast the fluent material in locations having tall, wet grass. As the spreader moves relative to the underlying surface, the bottom wall of the spreader comes into contact with the wet grass. The moisture from the grass can gain entrance into the hopper through the discharge openings. Some of the fluent material, such as fertilizer, characteristically absorbs moisture. The wet fluent material is thicker and agglomerates into relatively large clumps which have a tendency to clog the discharge openings. Such clogging, increases the time and effort expended by the user in spreading the fluent material.

It is an object of this invention to provide a spreader which includes a moisture barrier for preventing moisture from gaining entrance into the hopper of a drop spreader and thus prevents the discharge opening of the drop spreader from becoming clogged due to agglomeration of the fluent material.

SUMMARY OF THE INVENTION

The foregoing object and other objects of the present invention are attained in a spreader for fluent material having a hopper including front and rear walls, side walls joining said front and rear walls, and a bottom wall connected to said front, rear and side walls. A plurality of discharge openings are formed in the bottom wall and extend therethrough. The discharge openings have a leading end and a trailing end. A guard member is positioned adjacent to and forwardly of the leading end of each discharge opening and extends generally vertically downward from the bottom wall of the hopper within a range of 0°-15° relative to a line defining the vertical axis of the hopper.

DESCRIPTION OF THE PREFERRED EMBODIMENT

Figure 1:
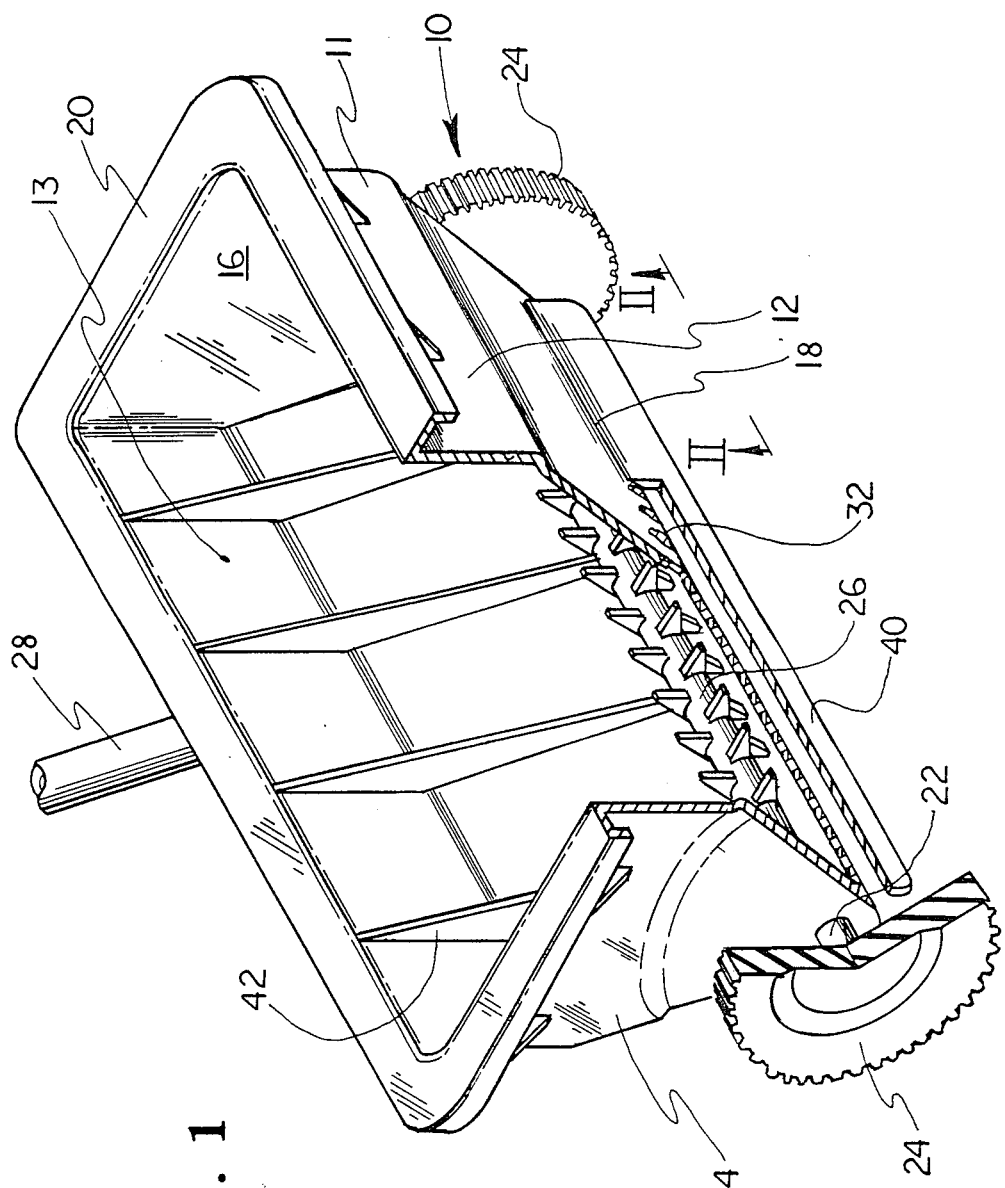
FIG. 1 is a perspective, partially broken view illustrating a spreader including the present invention.

Referring now to the various figures of the drawing, like numerals shall refer to like parts. FIG. 1 illustrates in perspective a drop spreader embodying the present invention. In particular, spreader 10 includes a hopper 11. Hopper 11 is preferably formed from a molded plastic, such as polypropolene. The hopper includes front wall 12, rear walls 13, side walls 14, 16, bottom wall 18, and a flange 20 defining a top wall.

The spreader is mounted on wheels 24 to enable the spreader to be pushed over the underlying ground. The movement of the spreader results in rotation of the wheels and axle 22 connected thereto. Axle 22, in turn, drives agitator 26. Agitator 26 is provided, as is well known to those skilled in the art, to discharge the fluent material contained within the hopper through discharge openings 32. Handle 28 is employed by the user to push the spreader over the underlying ground.

Figure 2:
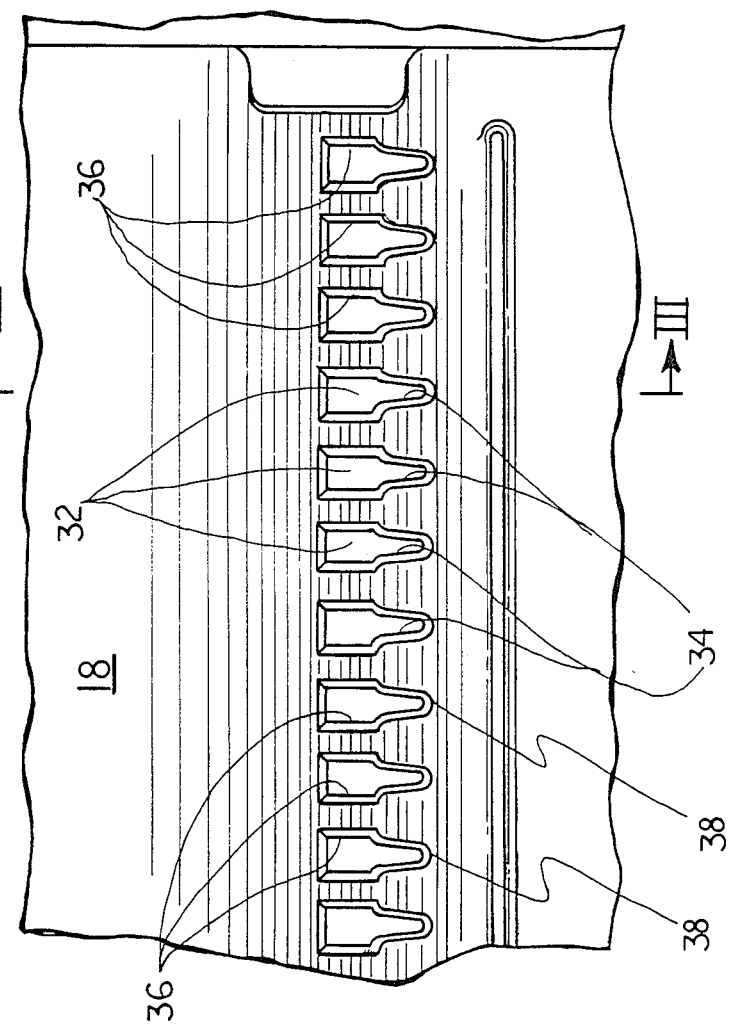
FIG. 2 is a sectional view taken along line II—II of FIG. 1.

Discharge openings 32 are formed in bottom wall 18. The discharge openings extend through the bottom wall and include a relatively restricted leading portion 34 and a relatively unrestricted trailing or following portion 36. As used herein, the term "leading portion" refers to the section of the discharge openings positioned towards the front of the spreader as the spreader is moved during normal operation, while the term "trailing or following portion" refers to the section of discharge openings 32 positioned to the rear of the spreader. Each opening 32 includes a relief portion 38 illustrated in FIGS. 2 and 3.

Figure 3:
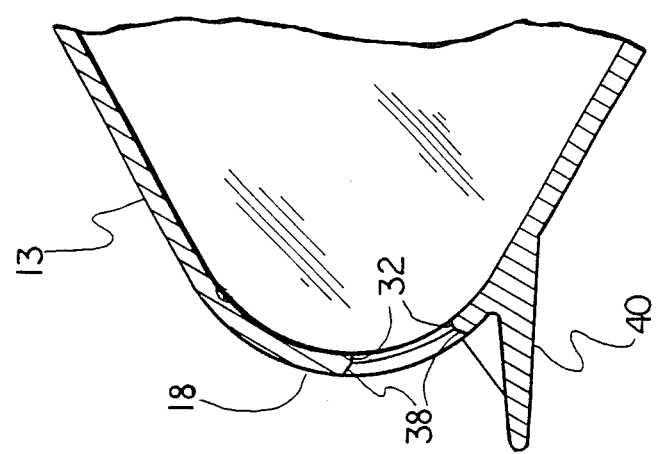
FIG. 3 is a sectional view taken along line III—III of FIG. 2.
Figure 4:
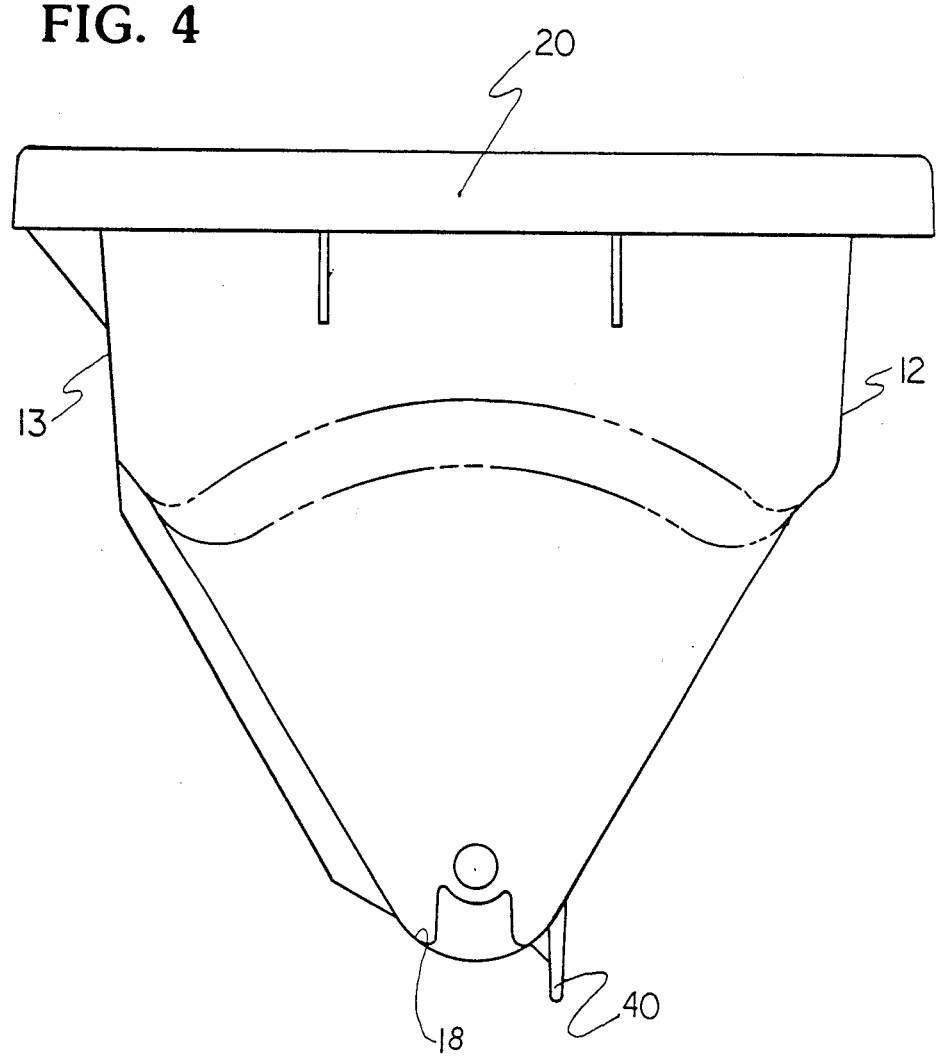
FIG. 4 is an end view of the spreader of FIG. 1 with the axle and wheel removed.

As particularly illustrated in FIGS. 3 and 4, hopper 11 includes a wall member 40 extending generally vertically downward from bottom wall 18. Wall member 40 is positioned generally adjacent to and forwardly of leading portion 34 of discharge openings 32. As illustrated, the arcuate distance between the wall member and leading portion 34 when measured along arcuate bottom wall 18 is substantially less than the arcuate distance when measured along the arcuate bottom wall between the trailing edge 36 of each discharge opening and the junction of the bottom and rear walls 18,13 respectively. Although wall member 40 is shown as extending generally vertically downward from bottom wall 18, it should be understood that member 40 may be canted within a range of 0°-15° relative to a line defining the vertical axis of the hopper. Ribs 42 are provided to add sufficient rigidity to the hopper walls.

As is well known, drop spreaders of the type disclosed are used to broadcast fluent materials such as fertilizer, seed, and weed killer. At times, the spreaders are utilized in areas which have tall, wet grass. As the spreader is moved through the tall, wet grass, bottom wall 18 of the spreader wipes against the surface of the grass and gathers moisture therefrom. With spreaders of the prior art, the moisture gains entrance into the hopper and mixes with the fluent material contained therein. Some fluent materials, such as fertilizer, have moisture absorbing characteristics. When moisture is absorbed by such materials, the particles of material tend to agglomerate which, when directed through discharge openings 32, tend to clog such openings.

To prevent the occurrence of such annoying problems to the user of spreader 10, wall member 40 functions as a moisture guard to prevent moisture from gaining entrance into hopper 11 via the discharge openings. As illustrated, guard member 40 is positioned adjacent to and forwardly of leading portion 34 of discharge openings 32. As the spreader is moved forwardly over the underlying ground, member 40 acts a barrier to prevent the grass from contacting the discharge openings which, in turn, prevents moisture from the grass from gaining entrance through openings 32 into hopper 11. Guard member 40 extends the full width of the drop area of spreader 10 and extends below the lowest elevation of discharge openings 32.

While a preferred embodiment of the present invention has been described and illustrated, the invention should not be limited thereto but may be otherwise embodied within the scope of the following claims.

I claim:

1. In a spreader for fluent material having a hopper, said hopper having front and rear downwardly converging walls, side walls joining said front and rear walls, and a generally arcuate bottom wall connected to said front, rear and side walls, means defining a plurality of discharge openings formed in the generally arcuate bottom wall and extending therethrough, said discharge openings having a leading end and a trailing end with respect to rotational movement of an agitator relative thereto, wherein said improvement comprises a guard member positioned adjacent to and forwardly of the leading end of each discharge opening and extending generally vertically downward from the outer surface of the bottom wall, said guard member being positioned within a range of 0°-15° relative to a line defining the vertical axis of the hopper, the arcuate distance between the guard member and the leading end of each discharge opening when measured along the arcuate bottom wall is substantially less than the arcuate distance when measured along the arcuate bottom wall between the trailing end of each discharge opening and the junction of the bottom and rear walls.

2. In a spreader in accordance with claim 1 wherein said guard member is generally parallel to the vertical axis of the hopper.

3. In a spreader in accordance with claim 2 wherein the hopper is molded from plastic and the guard member is integrally molded with the hopper.

4. In a spreader in accordance with claim 1 wherein the hopper is molded from plastic and the guard member is integrally molded with the hopper.

* * * * *